United States Patent [19]

Kreutze et al.

[11] 3,912,196

[45] Oct. 14, 1975

[54] TAPE TRANSPORT FOR RECORDING AND PLAYBACK APPARATUS, ESPECIALLY FOR TEACHING MACHINES

[75] Inventors: Gerhard Kreutze, Bammental; Manfred Moessner, Eppelheim; Guenther Obstfelder, Leimen; Gerhard Soehring, Dossenheim; Victor Pfirrmann, Ludwigshafen, all of Germany

[73] Assignee: Badische Anilin- & Soda-Fabrik Aktiengesellschaft, Ludwigshafen (Rhine), Germany

[22] Filed: Mar. 29, 1973

[21] Appl. No.: 346,088

[30] Foreign Application Priority Data

Mar. 29, 1972 Germany ............................ 2215295

[52] U.S. Cl. .................. 242/204; 226/50; 226/178; 226/188; 242/206; 242/208; 242/209

[51] Int. Cl.[2] ..................G11B 15/22; G11B 15/29; G11B 15/30

[58] Field of Search ........... 242/204, 206, 207, 208, 242/209, 210, 201, 202, 203, 205, 188, 186, 195, 191; 226/188, 181, 178, 49, 50, 51

[56] References Cited

UNITED STATES PATENTS

| | | | |
|---|---|---|---|
| 3,057,570 | 10/1962 | Smith | 242/203 |
| 3,070,321 | 12/1962 | Bara | 226/50 X |
| 3,169,720 | 2/1965 | Proctor | 242/204 |
| 3,385,497 | 5/1968 | Taraborrelli | 226/188 X |
| 3,759,464 | 9/1973 | Sato | 242/188 |

FOREIGN PATENTS OR APPLICATIONS

| | | | |
|---|---|---|---|
| 938,421 | 10/1963 | United Kingdom | 242/209 |
| 1,000,400 | 8/1965 | United Kingdom | 226/178 |

*Primary Examiner*—George F. Mautz
*Attorney, Agent, or Firm*—Johnston, Keil, Thompson & Shurtleff

[57] ABSTRACT

A tape transport for recording and playback apparatus which employs spools and in which the magnetic tape is moved by either of two capstans which constantly rotate in opposite directions, characterized in that a mechanical drive device, driven by a single motor, for driving the capstans and the drive spindles, is provided with two electromagnetically actuated clutches, which are operated one at a time, for coupling the drive device and either of the capstans, and with two electromagnetically actuated devices, which are operated one at a time, for coupling the capstans and the drive spindles, and separate braking devices are provided for the drive spindles and for the motor. An extremely simple, compact design, especially for automatic recording and playback apparatus, is thus obtained. As a result of using separate braking devices for the drive spindles and for the drive motor, extremely short braking and reversing times can be achieved even at high tape transport speeds. Tape transports according to the invention are of general applicability, but they can be used with particular advantage for recording and reproducing data, video signals and teaching programs.

6 Claims, 4 Drawing Figures

Figure 1:
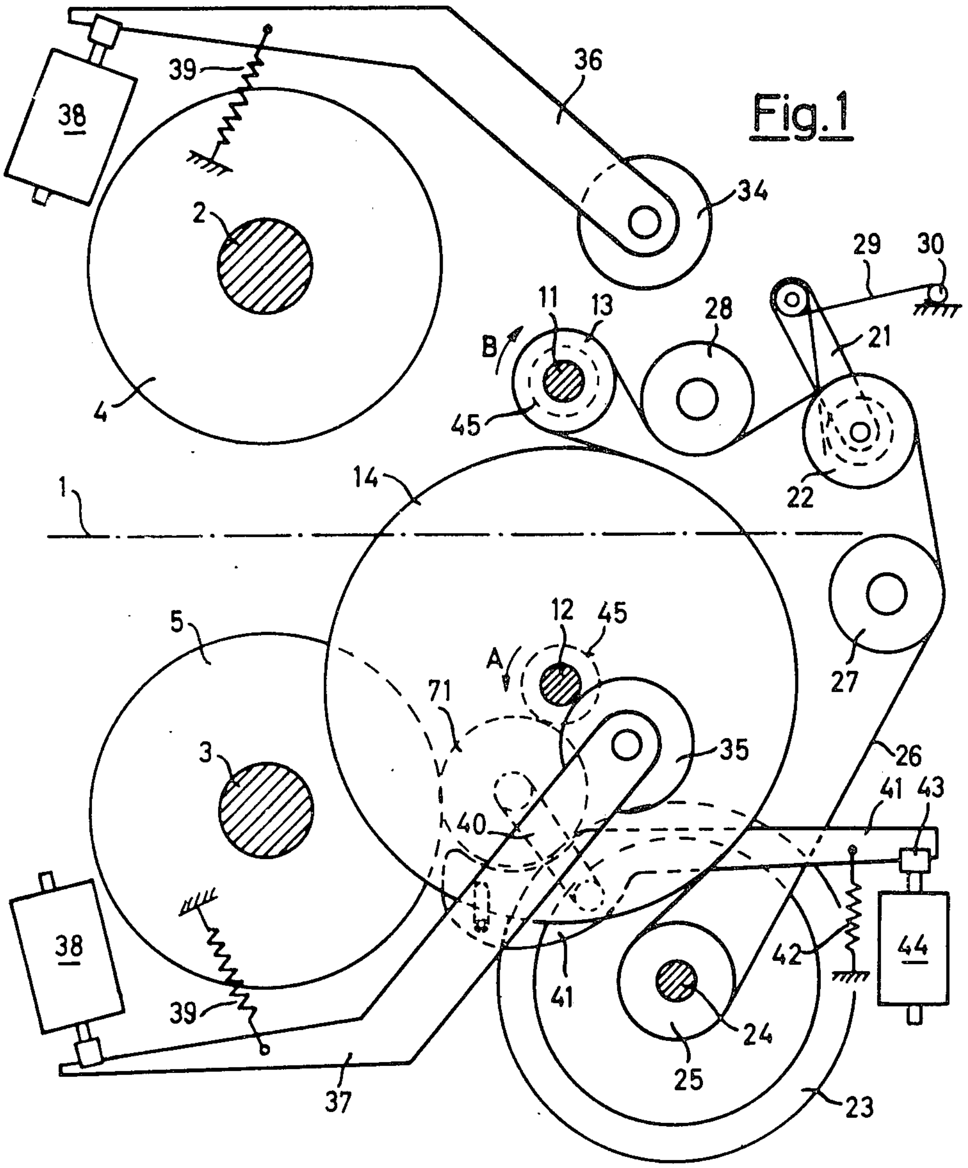

TAPE TRANSPORT FOR RECORDING AND PLAYBACK APPARATUS, ESPECIALLY FOR TEACHING MACHINES

This invention relates to a tape transport for recording and playback apparatus, especially for use in teaching machines, with drive spindles for spools carrying magnetic tape and with two capstans constantly rotating in opposite directions, which, for the purpose of transporting the tape, can be brought into contact with the magnetic tape by means of an electromagnetically actuated pressure rollers.

U.S. Pat. No. 3,091,380 discloses a tape transport with three drive motors by means of which two drive spindles and two capstans can be driven. Two of the drive motors serve to drive each drive spindle independently of one another via two electromagnetic clutches which can be actuated alternately for winding and rewinding. Braking of the spindles is effected by means of an electromagnetic braking device provided on each spindle. The capstans are permanently connected via an endless belt to the shaft of the third motor and can thus be caused to rotate constantly in opposite directions. To transport the tape, the tape is pressed by means of electromagnetically actuated pressure rollers against one or other of the capstans. These pressure rollers are used alternately depending on the requisite direction of tape motion.

This tape drive assembly has a high tape transport speed of approx. 6 meters per second during recording and playback in forward and reverse motion with short acceleration times and braking times, and is therefore very suitable for data storage applications. However, the extremely elaborate apparatus required to achieve these advantages is indeed considerable. In addition to three motors, of which two must have approximately identical characteristics, and a third motor which is also of the high-performance type, a total of four magnetic clutches, two magnetic braking devices and several actuating magnets for the pressure rollers are required. The large number of elements necessitates a correspondingly voluminous design.

Furthermore, German Printed Application No. 1,921,300 discloses a drive assembly for tape recorders with a single drive motor, wherein the motor shaft simultaneously rotates the drive wheels for effecting winding of the tape, and two capstans for transporting the tape. The drive wheels are two pulleys, one for the take-up reel and the other for the supply reel, which can be alternatively coupled to and uncoupled from the drive spindles via slip clutches. The advantages are said to be that, firstly, an extremely compact design is obtained and, secondly, the drive assembly can be used for a larger number of applications, for example in tape recorders where the tape is transported forwards and backwards. Disadvantages of this drive assembly are, in particular, that the speed range for recording and reproduction depends solely on the characteristics of the motor. Thus, at most one tape speed can be achieved, since conventional drive motors exhibit the constant speed necessary for avoiding wow and flutter virtually only at the rated speed. The use of slip clutches on the drive spindles does not permit a troublefree change in the direction of tape motion to be effected rapidly. Braking of the drive spindles and of the capstans is only possible by switching off or short-circuiting the motor, whereby, in the first case, the braking times are considerable, whilst in the second case braking leads to abrupt stoppage of the motor and of the drive assembly, which can, in the second case, damage the magnetic tape.

An object of the present invention is to provide a tape transport for recording and playback apparatus, especially for use in teaching machines with which controlled signal readout at widely varying tape transport speeds and extremely short tape braking times are possible and which exhibits good operational reliability and is of compact design.

This object is achieved according to the invention with a tape transport for recording and playback apparatus with drive spindles for the spools carrying the magnetic tape and two capstans which constantly rotate in opposite directions and which can be brought into contact with the magnetic tape, for the purpose of transporting the tape, by means of electromagnetically actuated pressure rollers, characterized in that a mechanical drive device, driven by a single motor, for driving the capstans and the drive spindles is provided with two electromagnetically actuated clutches, which are operated one at a time, for coupling the drive device and either of the capstans, and with two electromagnetically actuated devices, which are operated one at a time, for coupling the capstans and the drive spindles, and separate braking devices are provided for the drive spindles and for the motor.

A tape transport of this design can be used advantageously for tape recorders which are required to exhibit controllable running at normal tape speed and at a very much higher tape speed and which furthermore permit rapid switchover from one speed to the other, rapid changes in the direction of tape travel, and rapid braking of the tape. Such a tape transport can be used with particular advantage in teaching machines. During teaching it is desirable to present the instructional information within as short a time as possible even if the information is recorded on widely spaced sections of the tape. If the magnetic tape carries, in addition to acoustic information, signals for controlling a teaching program and a film projector, in such a way that the projector and the tape recorder run at their maximum controllable search speed until the information to be presented is reached and only then present the information synchronously with one another, it will be appreciated that the tape transport according to the invention fulfils these requirements outstandingly well. Hence, time losses during teaching are reduced to a minimum.

In a further advantageous embodiment of the tape transport according to the invention, the drive device consists of two drive pulleys of different diameter connected by a first endless belt, each drive pulley being located on a different capstan and being fast or loose thereon depending on the state of energization of an electromagnetic clutch, and a further pulley mounted on each of the capstans, the pulleys being connected via a second endless belt so as to provide synchronous rotation of the capstans in opposite directions.

As a result of this advantageous design controlled running of the tape at different speeds and rapid switchover from the first to the second speed and rapid changes in the direction of tape motion are achieved in a simple and reliable manner. Furthermore, a very compact design of the tape transport is obtained, thus making it suitable for a wide variety of applications.

In a further advantageous embodiment of the tape transport according to the invention, the coupling devices between the capstans and the drive spindles consist of drive wheels which are actuated one at a time, each drive wheel being rotatably mounted on a lever and being capable of being brought by means of an electromagnet into frictional contact with a drive spindle and the capstan rotating in the appropriate direction., Rapid changes in the direction of tape motion are therefore possible. The mechanical and electromagnetic means required to achieve this are simple though great emphasis has been placed on reliability in operation.

Advantageously, the tape transport according to the invention is provided with a braking device for each drive spindle which comprises a brake disc mounted on the drive spindle and one brake band, both brake bands being connected by two pivotable levers and being capable of being jointly brought, by means of an electromagnet, into the braking position.

An extremely efficient and simple device for effecting very rapid braking is thus obtained.

In a further embodiment, the braking device for the drive motor consists of a brake disc mounted on the motor shaft and a brake band cooperating therewith, which can be shortened, via a pivotable lever actuated by an electromagnet, to effect braking. Such a braking device for the motor, which is separate from the braking devices for the drive spindles, permits rapid braking of the rotatable elements of the tape transport and hence very short braking times down to tape standstill while being easy on the tape. This makes the tape transport of the invention very suitable for data reading purposes. Furthermore, controlled braking of the magnetic tape from a second high tape transport speed occurring during winding to the low speed is possible, the motor braking device also being actuated.

Figure 2:
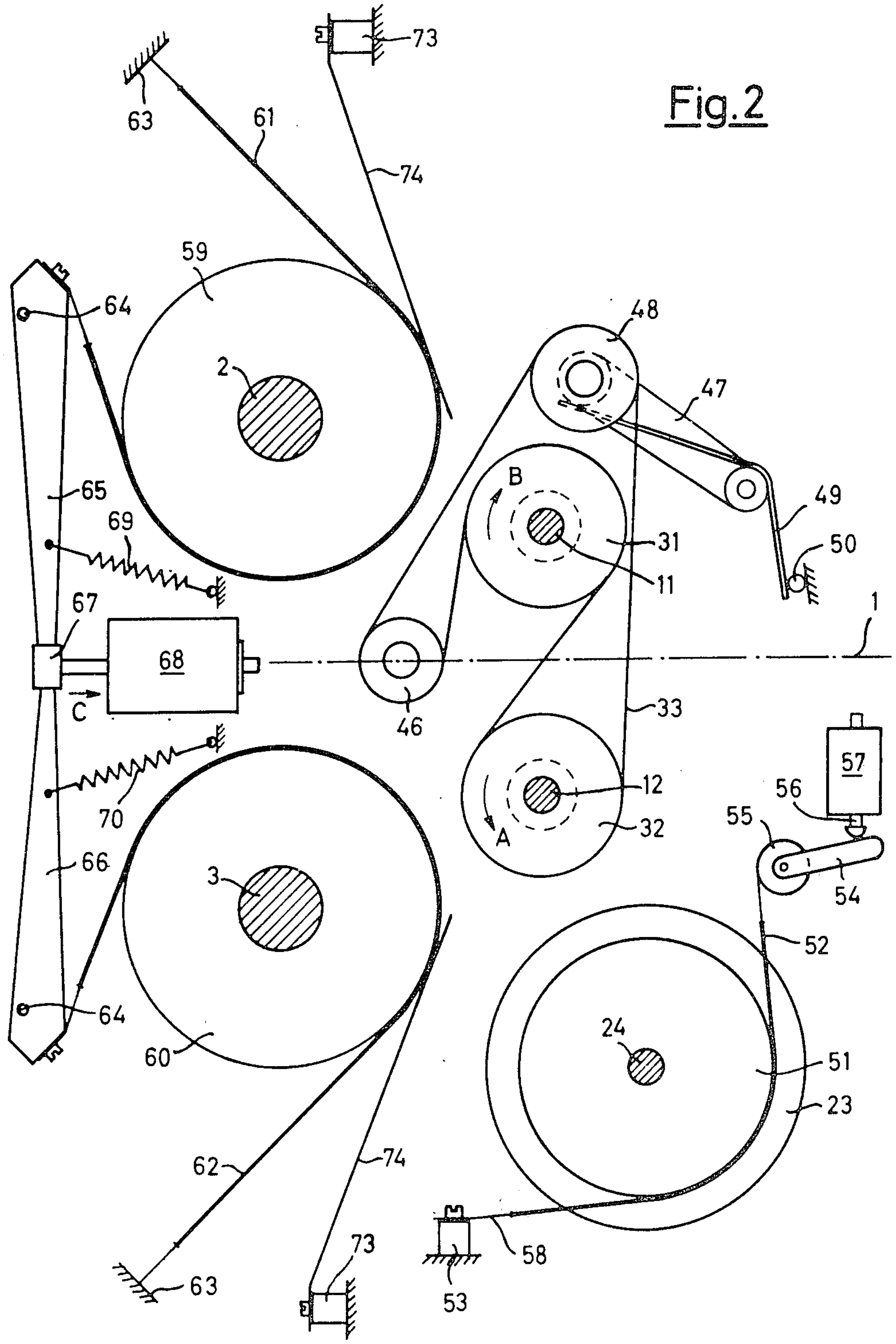
Figure 3:
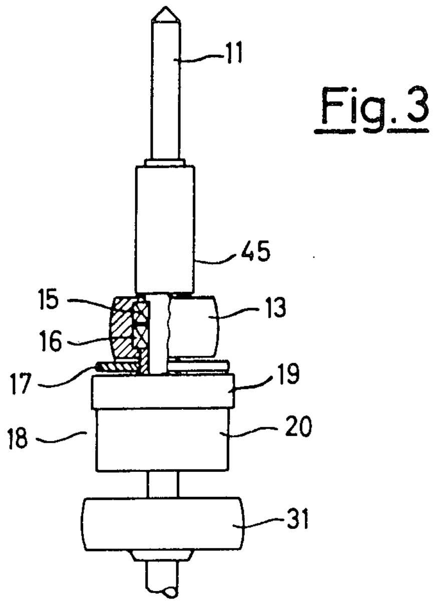
Figure 4:
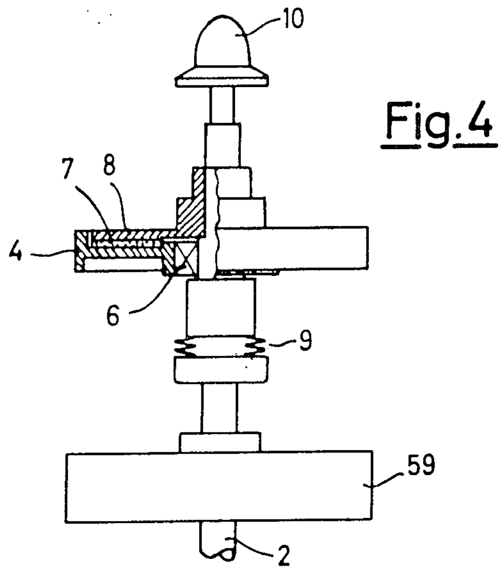

Further details of the invention are disclosed in the following description of one embodiment of the tape transport according to the invention illustrated in the accompanying drawings, in which FIG. 1 is a schematic diagram of the arrangement of the capstans and spindles with their drive means, FIG. 2 is a schematic diagram of the arrangement of the braking system of the tape transport which also illustrates how the capstans are coupled to one another, FIG. 3 shows a capstan, partly in elevation and partly in crosssection, and FIG. 4 shows a spindle, partly in elevation and partly in crosssection.

FIG. 1 shows spindles 2 and 3 located symmetrically with respect to central transverse axis 1, these spindles serving to drive the spools (not shown) carrying magnetic tape. The spindle 2 is shown by itself in FIG. 4. Concentrically mounted on the spindles 2 and 3, to rotate about ball bearings 6, are friction wheels 4 and 5 (see FIG. 4). Felt and friction discs 7 and 8 enable the speed of rotation of the capstan 12 or 11 which happens to be transporting the tape and that of the driven spindle 3 or 2 to be equalized. The drive from the capstan is effected via an intermediate wheel 71 which, through frictional contact, rotates one of the friction wheels 4, 5 whilst the spindle of the friction wheel not being driven is turned by the magnetic tape being drawn off the spool supported thereon. The friction disc 8 is rigidly attached to the spindle 2 so that friction wheel 4, which is constantly pressed by axial spring 9 against the felt disc 7 and hence against the friction disc 8, rotates with the spindle. Only where there is a difference in speed between the spindle and the capstan, which is mainly caused by changes in the diameter of the pack on the spool, does a difference in speed between the friction disc 8 and the friction wheel 4 arise until their speeds are again equal. A member 10 which receives the spool is located at the tip of the spindle. Brake discs 59 and 60 are rigidly attached to the lower part of the spindles 2 and 3.

FIG. 1 also shows capstans 11 and 12, located symmetrically with respect to transverse central axis 1, on which capstans are mounted concentrically, respectively, drive pulleys 13 and 14 which can rotate about ball bearings 15 and 16 but can also be rigidly coupled to their respective capstan. FIG. 3 shows capstan 11 by itself. An armature plate 17 is rigidly attached to the drive pulley 13. Axially below this armature plate 17 and surrounding the capstan 11 is an electromagnet 18, its rotor 19 being fixed to the capstan 11 and its stator 20 being fixed to the recorder chassis. Below the stator 20, capstans 11 and 12 carry pulleys 31 and 32 respectively.

Electromagnet 18 is so designed that it can couple capstan 11 or 12 to drive pulley 13 or 14 respectively in a fraction of a second. This coupling is effected by attracting the armature plate 17 to the rotor 19 of the magnet 18 when the latter is electrically energized. The diameter of drive pulley 14 is above five times that of drive pulley 13 in the embodiment shown. Since both drive pulleys 13 and 14 are driven conjointly by motor 23 via belt 26, the speed ratio of drive pulleys 13 and 14 is about 5:1. The motor 23 which drives belt 26 via pulley 25 mounted on the motor shaft 24 is an electronically controlled commutator-less motor of particulary compact design. Its rates speed is about 1,000 rpm and its maximum speed is about 6,000 rpm. However, the design and rated data of the motor can be selected to suit the particular application. Since the maximum speed of the motor 23, employed in the present embodiment, is six times its rated speed, mechanical and electrical speed changing combined permits switching of the tape speeds, for reading, in the ratio of 1:30. The normal tape transport speed is 4.75 cm/second and consequently the maximum reading speed is 1.44 m/second. If necessary, the motor 23 can, for example, be so switched that for fast forward and rewind modes a tape speed of about 60 times the normal speed is possible.

The drive pulleys 13 and 14 are simultaneously driven at their peripheries by belt 26. Rotatably mounted rollers 27 and 28 are also in frictional contact with belt 26, which is of the endless type, and serve to produce appropriate wraparound angles on the drive pulleys 13 and 14. The belt 26 is wrapped round the drive pulley 14 over an angle of approx. 150° and round the pulley 13, which is of smaller diameter, over an angle of about 270°. To produce the requisite constant tension in the belt 26, a roller 22 rotatably mounted on a pivotable lever 21 is provided, which roller is resiliently supported, by means of a hairpin spring 29, on a pin 30 which is fixed to the chassis.

The above-described switchover from normal speed to 30 times that speed for fast searching can be effected by switching the drive from drive pulley 14 to pulley 13 when both capstans 11 and 12 rotate continuously.

Continuous rotation of the capstans is achieved through the constant connection of the pulleys 31 and 32 on the lower part of the capstans by means of a further endless belt 33 (see FIG. 2). All that has to be done to change from one speed to the other is to actuate the electromagnets 18. For example, if the tape is transported via drive pulley 14 and consequently via capstan 12, normal forward motion is provided — provided that motor 23 rotates at the rated speed — when the drive pulley 14 is connected to capstan 12 via the electromagnet 18. In this case, the drive pulley 13 rotates freely on the bearings 15 and 16 about capstan 11 which in turn rotates at the same speed as capstan 12. To change speed, the clutch linking drive pulley 14 and capstan 12 is released, the clutch between capstan 11 and drive pulley 13 is engaged and simultaneously the motor 23 is switched over to six times the rated speed.

The capstans 11 and 12 are thus continuously driven at constant identical speed regardless of how they are coupled to the drive pulleys. However, as a result of the way in which the endless belt 33 is arranged, which is described below, the capstans rotate in opposite directions. For example, if capstan 12 rotates in the direction of arrow A, capstan 11 rotates in the direction of arrow B and vice versa. This makes possible rapid changes in the direction of tape motion regardless of the momentary speed of the capstans.

However, for transporting the tape, pressure rollers 34 and 35 are required, which bring the magnetic tape into frictional contact with the desired capstan 11 or 12. These pressure rollers 34 and 35 are rotatably mounted on levers 36 and 37 respectively; one lever at a time can be brought to bear against the desired capstan within a fraction of a second, for example by means of an electromagnetic 38. In FIG. 1, the pressure roller 35 on the lever 37 is clamped against capstan 12 rotating in the direction of arrow A so that the magnetic tape is transported from spindle 3 to spindle 2. A return spring 39 ensures the rapid return of pressure roller 34, 35 to its position of rest as soon as electromagnet 38 is switched off. Tape transportation includes both tape drive via the capstan concerned and the tape winding operation. To effect winding, an intermediate wheel 71 is used which is rotatably mounted on lever 40 that is hingedly attached to lever 41, and which can be brought into position between a friction surface 45 on capstan 12 or 11 and the friction wheel 5 or 4 on spindle 3 or 2, as shown in FIG. 1. The lever 41 is drawn toward the chassis of the recorder by means of a return spring 42 and is connected, at one end, to the sliding core 43 of electromagnet 44. For playback or recording the magnets 38 and 44 for the pressure roller 35 and intermediate wheel 71 respectively are actuated simultaneously. For winding, which is effected solely via one of the spindles 2 or 3, actuation of the pressure rollers is undesirable and is avoided by suitable control means. The control means for the electromagnets which have been described and are still to be described, for the motor and for the clutches do not form part of the present invention and are therefore not described.

All friction wheels, friction surfaces and belts of the embodiment of the invention which has been described are provided with a material exhibiting a high coefficient of friction in order to transfer the torque of the motor without slip and with as little loss as possible.

FIG. 2 shows how pulleys 31 and 32 on capstans 11 and 12 are connected to one another by belt 33. An additional rotatably mounted roller 46 serves to produce the same wraparound angles on both pulleys 31 and 32. A tensioning idler 48 is provided on a pivotably mounted lever 47 which is resiliently supported, by means of a hairpin spring 49, on a fixed pin 50 on the chassis. When capstan 12 rotates in the direction of arrow A, capstan 11 is continuously driven via belt 33 in the direction of arrow B, i.e., in the opposite direction. The motor 23 is provided with a brake disc 51 and a brake band 52 which contacts part of its periphery (over an angle of approx. 100°). The brake band 52 is fixed at one end to a clamping member 53 firmly attached to the chassis and is connected at the other end to an attachment roller 55 on lever 54. The lever 54 can be actuated by the sliding core 56 of an electromagnet 57, so that the brake band 52 is shortened and the motor 23 braked. The brake band 52, like brake bands 61 and 62, consists of a metal band 58 with a suitably treated textile covering.

As described above, the spindles 2 and 3 are provided with rigidly mounted brake discs 59 and 60 at their lower ends. The brake discs 59 and 60 are of the same diameter in the embodiment illustrated, brake bands 61 and 62 being wrapped round their periphery over an angle of about 230°. The brake bands 61, 62 are fixed at one end to the recorder chassis at points 63 and at the other end are firmly attached to the end of brake levers 65 and 66 respectively, each lever mounted so that it can turn about a pivot 64. Constant reliable contact between the brake bands and the brake discs is ensured by leaf springs 74 supported on members 73 firmly fixed to the chassis. The other ends of the brake levers 65 and 66 are conjointly connected to the core 67 of an electromagnet 68, which in the position shown is electrically energized so that when the recorder is off the brakes are automatically applied. In the vicinity of the point where levers 65 and 66 are connected to core 67, there are provided tension springs 69 and 70, respectively, attached to pins on the chassis. To apply the braking devices, electromagnet 68 is deenergized and core 67 moves in the direction of arrow C, springs 69 and 70 pulling the connected ends of the brake levers 65 and 66 in the same direction. As a result, the brake bands 61 and 62 are shortened and both spindles 2 and 3 are simultaneously braked very rapidly via the brake discs 59 and 60. In order to accelerate the braking operation, it is possible to switch off motor 23 at the same time as electromagnet 68 and to brake it by means of the brake disc 51 and the brake band 52. Combined braking of the motor and spindles gives very short braking times of the order of 15 thousandths of a second, as has been ascertained in experiments carried out under field operating conditions. By short-circuiting the motor 23, in conjunction with application of the braking devices for the spindles, even shorter braking times are possible, which is particularly advantageous for data storage applications. However, when using the above-described tape drive in teaching machines, it is more advantageous to effect braking by switching off the motor 23 and braking it mechanically in order to be able to change over, within an extremely short time, from a high search speed to normal tape transport speed. For this purpose, an electronic speed control unit for the motor can be used with advantage since, during the braking operation when the motor has reached its rated speed after having been switched off, the brakes can be released, and the motor can continue to operate at its rated speed. Extremely short switchover times from 30 times normal speed to normal speed are thus possible without the need for elaborate equipment.

The braking devices described above can, depending on the intended application of the instrument, also be operated separately.

The above-described tape transport and combinations of the various features have proved to be outstandingly effective in teaching machines.

While the invention has been particularly shown and described with reference to a preferred embodiment thereof, it will be understood by those skilled in the art that other changes in the form and details may be made without departing from the spirit and scope of the invention.

We claim:

1. In a tape transport which is particularly designed for use in a teaching apparatus and which includes:

a. two drive spindles upon which supply and take-up spools of tape can be mounted;

b. two capstans;

c. a capstan interconnecting means to cause said capstans to simultaneously rotate in opposite directions at the same speed of rotation; and d. two movable, individually electromagnetically actuatable, pressure rollers, each of said rollers being arranged to urge said tape against one of said oppositely rotating capstans upon actuation of said pressure roller; the improvement which comprises: combining with said elements *a* to *d* e. two drive pulleys of different diameters, the drive pulley of larger diameter being coaxially mounted on the first of said two capstans and the drive pulley of smaller diameter being coaxially mounted on the second of said two capstans, each of said drive pulleys being mounted for rotational movement coaxial with but free of its associated capstan;

f. two individually actuatable coupling devices, each of said coupling devices being arranged for coupling when actuated, a respective capstan to said associated drive pulley mounted thereon for synchronous rotation thereof;

g. a drive pulley interconnecting means to cause said drive pulleys to rotate at different speeds dependent on their respective different diameters when driven by a drive means; and h. a drive means consisting of a single motor for driving said drive pulley interconnecting means, whereby said capstans are rotated when one of said coupling devices is actuated;

and in a first condition of operation when upon actuation the first coupling device has coupled the large-diameter drive pulley to the first capstan, and the second coupling device not being actuated, said large-diameter drive pulley rotating the first capstan at a first low speed in a first direction of rotation and transferring said first low speed via the capstan interconnecting means to the second capstan for rotation in the second direction of rotation opposite to the first direction of rotation while the drive pulley interconnecting means transfers the rotation to the smaller diameter drive pulley for rotation around the second capstan and in a second condition of operation, when the first coupling device is not actuated and upon actuation of the second coupling device the smaller diameter drive pulley has been coupled to the second capstan, said smaller diameter drive pulley rotating the second capstan at a second higher speed in said second direction of rotation and transferring via the capstan interconnecting means the second higher speed to the first capstan while the drive pulley interconnecting means transfers the rotation to the smaller diameter drive pulley for free rotation around the said first capstan.

2. A tape transport as set forth in claim 1 wherein the improvement further comprises a rotatably and movably mounted drive wheel which can be shifted by means of an electromagnet into frictional contact with one of said drive spindles and one of said capstans whereby said drive spindle with a tape spool mounted thereon is driven by said capstan.

3. A tape transport as set forth in claim 1 wherein said coupling devices comprise electromagnetic clutches.

4. A tape transport as set forth in claim 1 wherein said drive pulley interconnecting means comprises:

an endless belt interconnecting said drive pulleys and a pulley on the shaft of said drive means; and a tension producing means to maintain the tautness of said belt.

5. A tape transport as set forth in claim 1 wherein the improvement further comprises:

a braking device for each of the two said drive spindles, each of said braking devices consisting of a brake disk on one of said drive spindles and a brake band, one end of which is securely fastened; and two pivotable levers, one end of each of said levers being attached to an end of one of said brake bands, the other end of said pivotable levers being conjoined for movement by means of an electromagnet into a position which causes said brakebands to bear against said brake disks.

6. A tape transport as set forth in claim 1 wherein the improvement further comprises a braking device for said motor consisting of a brake disc mounted on the shaft of said motor and a brake band which can be brought into engagement therewith by means of an electromagnet.

* * * * *